(12) United States Patent
Rabin

(10) Patent No.: US 8,061,054 B2
(45) Date of Patent: Nov. 22, 2011

(54) WALL HANGING AID

(76) Inventor: Jared Rabin, Irvine, CA (US)

( * ) Notice: Subject to any disclaimer, the term of this patent is extended or adjusted under 35 U.S.C. 154(b) by 264 days.

(21) Appl. No.: 12/418,792

(22) Filed: Apr. 6, 2009

(65) Prior Publication Data

US 2009/0188121 A1    Jul. 30, 2009

Related U.S. Application Data

(63) Continuation-in-part of application No. 12/123,977, filed on May 20, 2008.

(51) Int. Cl.
*G01B 3/02* (2006.01)

(52) U.S. Cl. ................ 33/613; 33/342; 33/376

(58) Field of Classification Search ............ 33/342, 33/376, 370, 613, 484
See application file for complete search history.

(56) References Cited

U.S. PATENT DOCUMENTS

| | | | | | |
|---|---|---|---|---|---|
| 4,070,764 | A | * | 1/1978 | Rohlinger | 33/342 |
| 5,560,116 | A | * | 10/1996 | Tobia | 33/365 |
| 6,199,288 | B1 | * | 3/2001 | Gregory | 33/484 |
| 6,473,983 | B1 | * | 11/2002 | Gier | 33/613 |
| 6,785,977 | B1 | * | 9/2004 | Crichton | 33/613 |

OTHER PUBLICATIONS

Black & Decker Power Tools, "36 Accu Mark Gecko Grip Level," one (1) page from website blackanddecker.com; Apr. 28, 2008.

\* cited by examiner

*Primary Examiner* — Amy J Sterling

(74) *Attorney, Agent, or Firm* — Orrick, Herrington & Sutcliffe, LLP

(57) ABSTRACT

An adjustable picture and wall hanging device comprising an elongated strap having thereon a pair of spaced sliders, each slider having a point thereon to enable a spot to be marked on a wall, and a level centrally mounted on the strap for facilitating leveling of the device so that the item to be mounted will be level. Alternatively the level can be on one slider. This device enables pictures and other items to be hung on a wall in a simple, quick and easy manner.

2 Claims, 3 Drawing Sheets

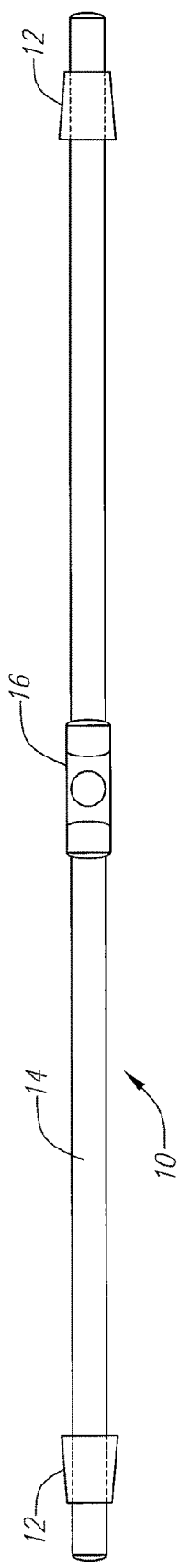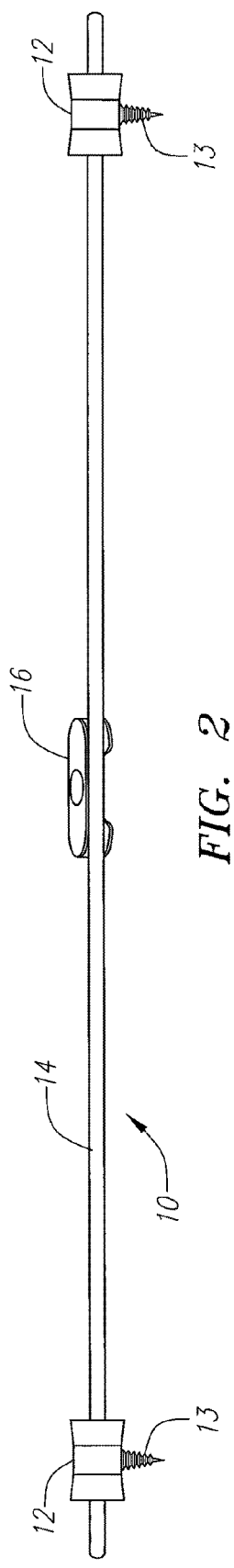

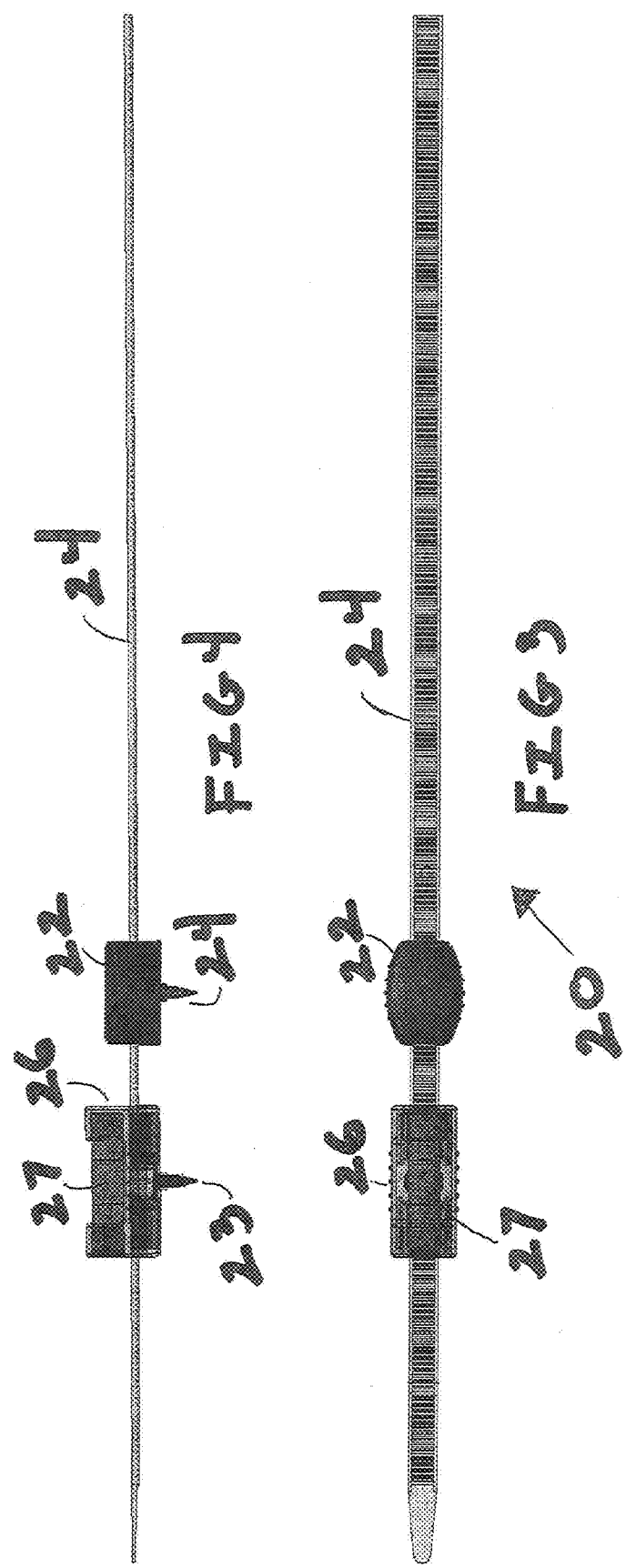

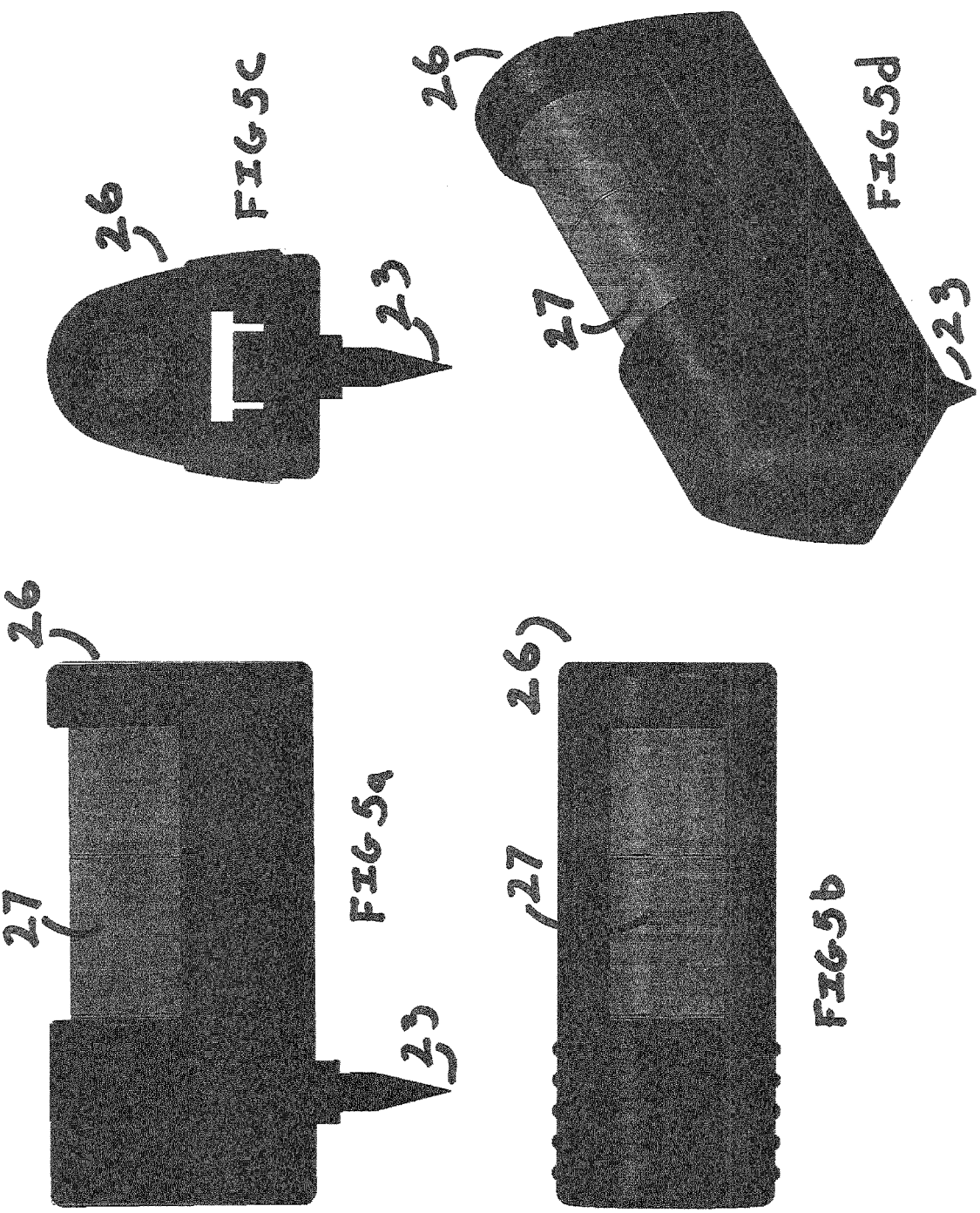

WALL HANGING AID

CROSS-REFERENCE TO RELATED APPLICATIONS

This application is a continuation-in-part of application Ser. No. 12/123,977 filed May 20, 2008, and is incorporated herewith in its entirety.

BACKGROUND OF THE INVENTION

Hanging pictures and other items on a wall or the like can be simple or complicated. When one hook is used, it is a relatively simple matter to position it accurately so that the picture will hang properly. On the other hand, where two or more spaced hooks are used, there can be difficulty setting the spacing and particularly making sure they are at the same height so that the picture will be level. If one of the two hooks is either higher or lower than the other then it is apparent that the picture will hang at an angle, and multiple attempts will be made to set the spacing correctly.

The purpose of the present invention is to provide a simple device to mark spaced anchor points evenly level.

Accordingly, a principal purpose of the present invention is to provide an improved wall hanging aid.

BRIEF DESCRIPTION OF THE DRAWINGS

These and other features and objects of the invention will become better understood for consideration of the following description and drawings wherein FIG. 1 is a top view of the hanging aid, and
FIG. 2 is a side view thereof.
FIGS. 3-5 illustrate an improved hanging aid.

DETAILED DESCRIPTION OF THE INVENTION

The present invention relates to an adjustable picture and wall hanging device to mark hanging anchor points on a wall level. This device can be made of any material not limited to, but including metal, plastic or the like so it can be folded or rolled up for storage. Turning first to FIGS. 1-2, the device 10 has two sliders 12 with points 13 that can be slid to adjust to align the anchor hanging points. These sliders are moved along a flexible strap 14. The adjustable points 13 are used to make puncture dimples into the wall. The sliders can lock into place by friction so the spacing thereof is not altered before the puncture dimples can be made. This device has a built-in level 16 so that the puncture dimples can be leveled without one being higher or lower than the other. Slight pressure is applied to the sliders 12 against the wall so that the two puncture dimple marks are made into the wall by the points 13.

The first step is to align the two sliders 12 to the center of the anchor hanging points of the item to be hanged. The second is to lift the device 10 to the desired location. Third is to level with the built-in level 16 so the measured adjustable points are level. Fourth is to apply a small amount of pressure to the sliders so that small puncture dimples are made into the wall by the points 13. The last step is to place the desired anchors into the premeasured and leveled puncture dimple marks.

This device can also be constructed without the level to just measure anchor spacing. The adjustability of this device can be constructed with the two sliding pieces or with a series of collapsible pieces that are fit into each other. This device can also be constructed with a piece of cable, rope or other non-rigid material. This device preferably uses a bubble level, but can also be made with a laser level to ensure the puncture holes are level on the wall. The device has the two points 13 that puncture two holes into the wall, but the same device could utilize a marker, chalk, pencil, pen or paint marker to indicate the two places the anchors should be set.

FIGS. 3-5 illustrate an improved version of a wall hanging aid, and one which uses two sliders rather than three used in the description above, and uses only three parts. FIG. 3 is a top view of the hanging aid, FIG. 4 is a side view, and FIG. 5a-5d are different views of a slider and level. The aid includes a strap 24, point slider 22 and point/level slider 26. The parts can be mostly plastic except preferably the hanging points 23 and 24 are metal. The strap 24 preferably is a nylon zip tie, but could also be plastic, aluminum or steel. The strap 24 is easy to coil, but difficult to bend side to side which helps to maintain straight horizontal integrity.

Slider 22 preferably is made of nylon or plastic, but could be made of aluminum or steel. It has small finger grips on the side as seen in FIG. 3. The point 24 is preferably steel (and can be the point of a nail). The slider 26 likewise is made of a similar material to that of slider 22. This slider 26 includes a small bubble level 27. The point 23 is like the point 24 of slider 22.

The strap 24 has vertical notches as can be seen in FIG. 3 which act similar to a railroad track so that the sliders lightly lock into place when the sliders are moved to a suitable position. They help to get a correct measurement since the sliders stay where they are put and one can lift the hanging aid to make the suitable marks on a wall onto which an object is to be hung.

As noted with respect to the embodiment of FIGS. 1-2, instead of using a tape measure or laser level, the present hanging aid can give precise locations for the nail, anchor, screw or whatever item is used to hang an item on a wall. The aid simply adjusts to line up with hanging points on the rear of the item to be hanged, and then taken to the wall and pressed against the wall once the aid is leveled. This results in two dimple marks caused by the pointers 23 and 24. As an alternative, the pointers 23 and 24 could be replaced by something to leave a mark such as by way of ink, and such as the end of a ball point pen, chalk, paint marker or pencil.

Although the preferred strap 24 is a nylon zip-tie as discussed above, it could be a solid with a negative or positive clamp to hold the sliders in place, and by pushing or pressing a button one could release pressure.

Various changes, modifications, variations, and other uses and applications of the subject invention will, however, become apparent to those skilled in the art after considering this specification together with the accompanying drawings and claims. All such changes, modifications, variations, and other uses of the applications which do not depart from the spirit and scope of the invention are deemed to be covered by the invention, which is limited only by the claims which follow.

What is claimed is:

1. A picture and/or wall hanging device to mark hanging anchor points level on a flat wall comprising:
   an elongated flexible strap comprising a flexible cable,
   two sliders mounted spaced apart on the strap, with each slider having marking points and being adjustable to align two spaced anchor hanging points desired, the sliders being fixedly adjustable on the strap so as to retain selected positions, and
   one of said sliders including a level to enable adequate leveling of the device.

2. A device as in claim 1 wherein the points of the sliders are mounted centrally on one side of each slider.

* * * * *